United States Patent
Zhang (10) Patent No.: US 11,360,638 B2
(45) Date of Patent: Jun. 14, 2022

(54) METHOD FOR PROCESSING ICONS AND MOBILE TERMINAL

(71) Applicant: VIVO MOBILE COMMUNICATION CO., LTD., Chang'an Dongguan (CN)

(72) Inventor: Weiwei Zhang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 125 days.

(21) Appl. No.: 16/493,433

(22) PCT Filed: Mar. 13, 2018

(86) PCT No.: PCT/CN2018/078806
§ 371 (c)(1),
(2) Date: Sep. 12, 2019

(87) PCT Pub. No.: WO2018/166434
PCT Pub. Date: Sep. 20, 2018

(65) Prior Publication Data
US 2020/0012411 A1   Jan. 9, 2020

(30) Foreign Application Priority Data
Mar. 16, 2017   (CN) .......................... 201710156769.6

(51) Int. Cl.
*G06F 3/04817* (2022.01)
*G06F 3/0482* (2013.01)
(Continued)

(52) U.S. Cl.
CPC ........ *G06F 3/04817* (2013.01); *G06F 3/0482* (2013.01); *G06F 3/0488* (2013.01); *H04M 1/72469* (2021.01)

(58) Field of Classification Search
None
See application file for complete search history.

(56) References Cited

U.S. PATENT DOCUMENTS

2011/0246918 A1   10/2011   Henderson
2012/0096400 A1   4/2012   Cho
(Continued)

FOREIGN PATENT DOCUMENTS

CN   102455873 A   5/2012
CN   102799357 A   11/2012
(Continued)

OTHER PUBLICATIONS

Extended European Search Report for European Application No. 18767953.5, dated Mar. 11, 2020 (Mar. 11, 2020)—7 pages.
(Continued)

*Primary Examiner* — Matthew Ell
*Assistant Examiner* — David V Luu
(74) *Attorney, Agent, or Firm* — Culhane Meadows PLLC; Stephen J. Weed (57) ABSTRACT

A method for processing icons and a mobile terminal are provided. The method for processing icons includes: obtaining, in response to detecting a pinching operation by a user on multiple icons, attribute information about each of the multiple icons; and performing a classification operation on the multiple icons based on the attribute information.

9 Claims, 5 Drawing Sheets obtaining, in response to detecting a pinching operation by a user on multiple icons, attribute information about each icon of the multiple icons — 101 performing a classification operation on the multiple icons based on the attribute information — 102

(51) Int. Cl.
   *G06F 3/0488*     (2022.01)
   *H04M 1/72469*    (2021.01)

(56) References Cited

U.S. PATENT DOCUMENTS

| | | | |
|---|---|---|---|
| 2013/0097538 A1* | 4/2013 | Park | G06F 3/0488 |
| | | | 715/765 |
| 2013/0167090 A1 | 6/2013 | Tomizu | |
| 2014/0149901 A1* | 5/2014 | Hunter | G06F 3/017 |
| | | | 715/765 |
| 2014/0189602 A1 | 7/2014 | Wang et al. | |
| 2014/0317544 A1 | 10/2014 | Wang | |
| 2016/0110069 A1 | 4/2016 | Tanoue | |
| 2016/0139748 A1 | 5/2016 | Iwaizumi et al. | |
| 2016/0342306 A1 | 11/2016 | Ho | |
| 2016/0370960 A1 | 12/2016 | Baek | |
| 2017/0357433 A1* | 12/2017 | Boule | G06F 3/04817 |

FOREIGN PATENT DOCUMENTS

| | | |
|---|---|---|
| CN | 103294401 A | 9/2013 |
| CN | 103914206 A | 7/2014 |
| CN | 106469015 A | 3/2017 |
| CN | 106951141 A | 7/2017 |

OTHER PUBLICATIONS

1st Chinese Office Action for Chinese Application No. 201710156769.6, dated Apr. 17, 2018 (Apr. 17, 2018)—8 pages (English translation—5 pages).
Chinese Search Report for Chinese Application No. 201710156769.6, dated Dec. 7, 2017 (Dec. 7, 2017)—9 pages.
International Search Report and Written Opinion for International Application No. PCT/CN2018/078806, dated Sep. 26, 2019 (Sep. 26, 2019)—11 pages (English translation—7 pages).

\* cited by examiner

METHOD FOR PROCESSING ICONS AND MOBILE TERMINAL

CROSS-REFERENCE TO RELATED APPLICATION

This application is the U.S. national phase of PCT Application No. PCT/CN2018/078806 filed on Mar. 13, 2018, which claims a priority to Chinese Patent Application No. 201710156769.6 filed on Mar. 16, 2017, both of which are incorporated in their entireties by reference herein.

TECHNICAL FIELD

The present disclosure relates to the field of terminal technology, in particular to a method for processing icons and a mobile terminal.

BACKGROUND

At present, a large quantity of applications may be installed in a mobile terminal by a user during using it. In order to improve interface appearance or facilitate the finding of the applications, the user usually sorts the applications according to his or her own preference or usage habit.

In the related art, when a user wants to sort out desktop icons, it is usually required to long press an application icon to set the mobile terminal desktop to a movable state, and then drag the application icon into a specified folder or to a position where another application icon is located. For applications that are on different pages, a page turning operation is needed. This process is complicated and not intuitive.

SUMMARY

A method for processing icons and a mobile terminal are provided according to the present disclosure, to address the technical problem in related art that sorting out desktop icons is complicated.

In order to address the above technical problem, a method for processing icons is provided according to the present disclosure, which is applied to a mobile terminal. The method includes:

obtaining, in response to detecting a pinching operation by a user on multiple icons, attribute information about each icon of the multiple icons; and performing a classification operation on the multiple icons based on the attribute information.

A mobile terminal is further provided according to the present disclosure, which includes:

a first obtaining module, configured to obtain, in response to detecting a pinching operation by a user on multiple icons, attribute information about each icon of the multiple icons; and a processing module, configured to perform a classification operation on the multiple icons based on the attribute information.

A mobile terminal is further provided according to the present disclosure, which includes: at least one processor, a memory, at least one network interface and a user interface; and a bus system. The at least one processor, the memory, the at least one network interface and the user interface are coupled by the bus system above, and the at least one processor is configured to perform steps of the method for processing icons by invoking a program or instructions stored in the memory.

A computer readable storage medium is further provided according to the present disclosure, a computer program is stored hereon, and the computer program is executed by a processor to implement steps of the method for processing icons as described above.

DETAILED DESCRIPTION

In order to make a technical problem to be solved, a technical solution and advantages of the present disclosure more apparent, the present disclosure will be described hereinafter in detail and in conjunction with the drawings and embodiments.

Multiple technical solutions are provided according to the present disclosure hereinafter in order to address the problem that a solution to sort out desktop icons is complicated in related art.

Figure 1:
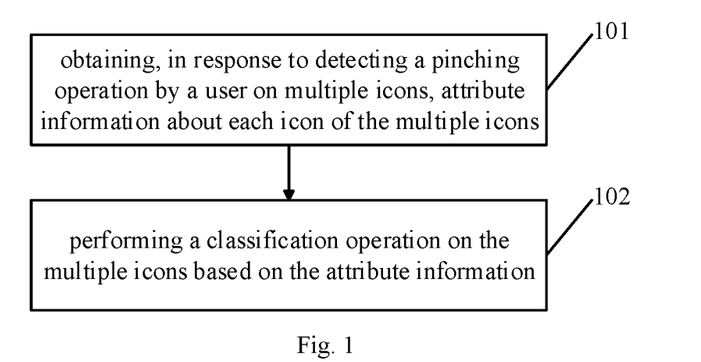
FIG. 1 is a schematic flowchart of a method for processing icons according to at least one embodiment of the present disclosure.

As shown in FIG. 1, a method for processing icons is provided according to at least one embodiment of the present disclosure, which may be applied to a mobile terminal. The processing method includes steps 101 and 102.

Step 101 includes obtaining, in response to detecting a pinching operation by a user on multiple icons, attribute information about each icon of the multiple icons.

In the embodiment, which icons are selected may be determined by detecting a pressing operation and whether there is a pinching operation on the selected icons by the user is then detected. Attribute information about each of the selected icons is obtained in a case that the pinching operation on the icons selected by the user is detected. The pinching operation in the embodiment of the present disclosure refers to an operation event in which the user clicks different icons with multiple fingers and gathers the multiple fingers toward a same center.

The attribute information includes types of icons, which, for example, may be applications or folders.

Step 102 includes performing a classification operation on the multiple icons based on the attribute information.

In the embodiment, types of the multiple icons can be obtained based on the attribute information, and the icons are classified based on the types.

The classification herein may refer to grouping icons of a same type together, or grouping icons of different types selected by the user together, which is not limited herein.

As can be seem from the above, in the method for processing icons according to at least one embodiment of the present disclosure, when the pinching operation on the multiple icons has been detected, attribute information about each icon of the multiple icons is obtained, and the multiple icons are classified based on the obtained attribute information. In this way, the icons can be sorted out quickly and conveniently, the use experience is improved while more enjoyment is provided during the operation, and the problem that the operation of sorting out the desktop icons is complicated in the related art is solved.

Figure 2:
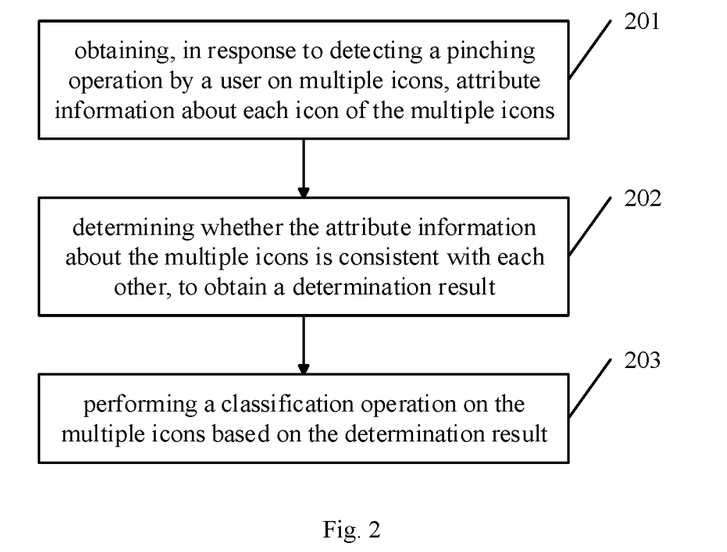
FIG. 2 is a schematic flowchart of a method for processing icons according to at least one embodiment of the present disclosure.

As shown in FIG. 2, a method for processing icons is provided according to at least one embodiment of the present disclosure, which may be applied to a mobile terminal. The processing method includes steps 201 to 203.

Step 201 includes obtaining, in response to detecting a pinching operation by a user on multiple icons, attribute information about each icon of the multiple icons.

In the embodiment, which icons are selected may be determined by detecting a pressing operation and whether there is a pinching operation on the selected icons by the user is then detected. Attribute information about the selected icons is obtained in a case that the pinching operation on the icons selected by the user is detected. The pinching operation in the embodiment of the present disclosure refers to an operation event in which the user clicks different icons with multiple fingers and gathers the multiple fingers toward the same center.

The attribute information includes types of icons, which, for example, may be applications or folders.

Step 202 includes determining whether the attribute information about the multiple icons is consistent with each other, to obtain a determination result.

In the embodiment, it may be determined whether some or all of the attribute information about the multiple icons is consistent with each other.

Step 203 includes performing a classification operation on the multiple icons based on the determination result.

The classification herein may refer to placing icons of the same type together, or placing icons of different type selected by the user together, which is not limited herein.

To be specific, the performing the classification operation on the multiple icons based on the determination result may include: creating, in a case that the determination result indicates that the attribute information about the multiple icons is consistent with each other and the attribute information indicates that the multiple icons are all application icons, a folder at a predetermined position (which may be preferably a position of the rearmost icon) on a desktop of the mobile terminal and moving all the multiple icons into the folder; or selecting, in a case that the determination result indicates that the attribute information about the multiple icons is consistent with each other and the attribute information indicates that the multiple icons are all folder icons, a target folder from folders corresponding to the multiple icons, determining the other of the folders as to-be-processed folders, moving all items in the to-be-processed folders into the target folder and deleting the to-be-processed folders of which all the items have been removed.

For example, icons A and B are obtained. In a case that both icons A and B are application icons, a folder is created on the desktop (at a position where the icon B is located) and both icons A and B are moved into the created folder. In a case that both icons A and B are folder icons, a folder corresponding to icon B is determined as the target folder in accordance with a predetermined rule, items in a folder corresponding to icon A are all moved into the folder corresponding to icon B, and icon A corresponding to the empty folder after the removal of the items is deleted.

The items in the folder may include at least one of an application icon, a file (an audio file or a plain text file), or a folder, which will not be particularly defined herein.

Correspondingly, the performing the classification operation on the multiple icons based on the determination result includes: moving, in a case that the determination result indicates that the attribute information about the multiple icons is not consistent with each other and the attribute information indicates that the multiple icons include multiple application icons and a folder icon, all the multiple application icons into a folder corresponding to the folder icon; or selecting, in a case that the determination result indicates that the attribute information about the multiple icons is not consistent with each other and the attribute information indicates that the multiple icons include multiple application icons and multiple folder icons, a target folder from folders corresponding to the multiple folder icons, determining the other folders as to-be-processed folders, moving all the multiple application icons and all items in the to-be-processed folders into the target folder and deleting the to-be-processed folders of which all the items have been removed.

For example, icons A, B, C and D are obtained. In a case that icons A, B and C are application icons and icon D is a folder icon, all the icons A, B and C are moved into a folder corresponding to icon D; or in a case that both icons A and B are application icons and both icons C and D are folder icons, a folder corresponding to icon D is determined as the target folder based on a predetermined rule, all items in a folder corresponding to icon C are moved into the target folder, icon C corresponding to the empty folder rendered by removing all the items is deleted, and both icons A and B are moved into the folder corresponding to icon D.

Further, after performing the classification operation on the multiple icons based on the attribute information, the processing method further includes: obtaining an icon on the desktop of the mobile terminal that has met a predetermined condition and has not been sorted out; and performing a predetermined shifting and filling operation on the icon that has met the predetermined condition and has not been sorted out, based on a vacancy occurring after the classification operation.

In other words, some icons meeting the condition are obtained and occupy the vacancies on the desktop (preferably filling the vacancies forward successively) to ensure decent appearance of the desktop.

Specifically, the step of obtaining an icon on the desktop of the mobile terminal that has met a predetermined condition and has not been sorted out includes: obtaining, from the desktop of the mobile terminal, an icon of the other applications having the same type, same installation time and/or same using frequency as applications corresponding to the multiple icons, and determining the icon of the other application as the icon that has met a predetermined condition and has not been sorted out.

To put it another way, the type, installation time and using frequency of the applications corresponding to the sorted-out icons are obtained, and the desktop is searched for icons of other applications having the same type, the same installation time and/or the same using frequency, which are determined as the icons meeting the condition.

In an embodiment, the icon that has met a predetermined condition and has not been sorted out may also be an icon of a folder, which is not limited herein.

The method for processing icons according to the embodiments of the present disclosure is further described hereinafter.

In view of the technical problem above, a method for processing icons is provided according to at least one embodiment of the present disclosure, which may be a method for sorting out icons on the desktop in a specific example. The method includes: determining, in a case that a standby desktop detects a pressing operation by two fingers on a screen and a pinching operation by the two fingers, whether pressed targets correspond to two different application or an application plus a folder; creating, in a case that the pressed targets correspond to two different applications, a new folder and moving the pressed targets into the new folder; and moving, in a case that the pressed targets correspond to an application plus a folder, an icon of the application into the folder.

Further, a type of applications in the folder is obtained, the desktop is searched for icons of other applications having the same type, and these icons may be forward filled automatically and sequentially in vacancies. The searching operation may be performed based on a parameter such as installation time or frequency of use of the applications.

Figure 3:
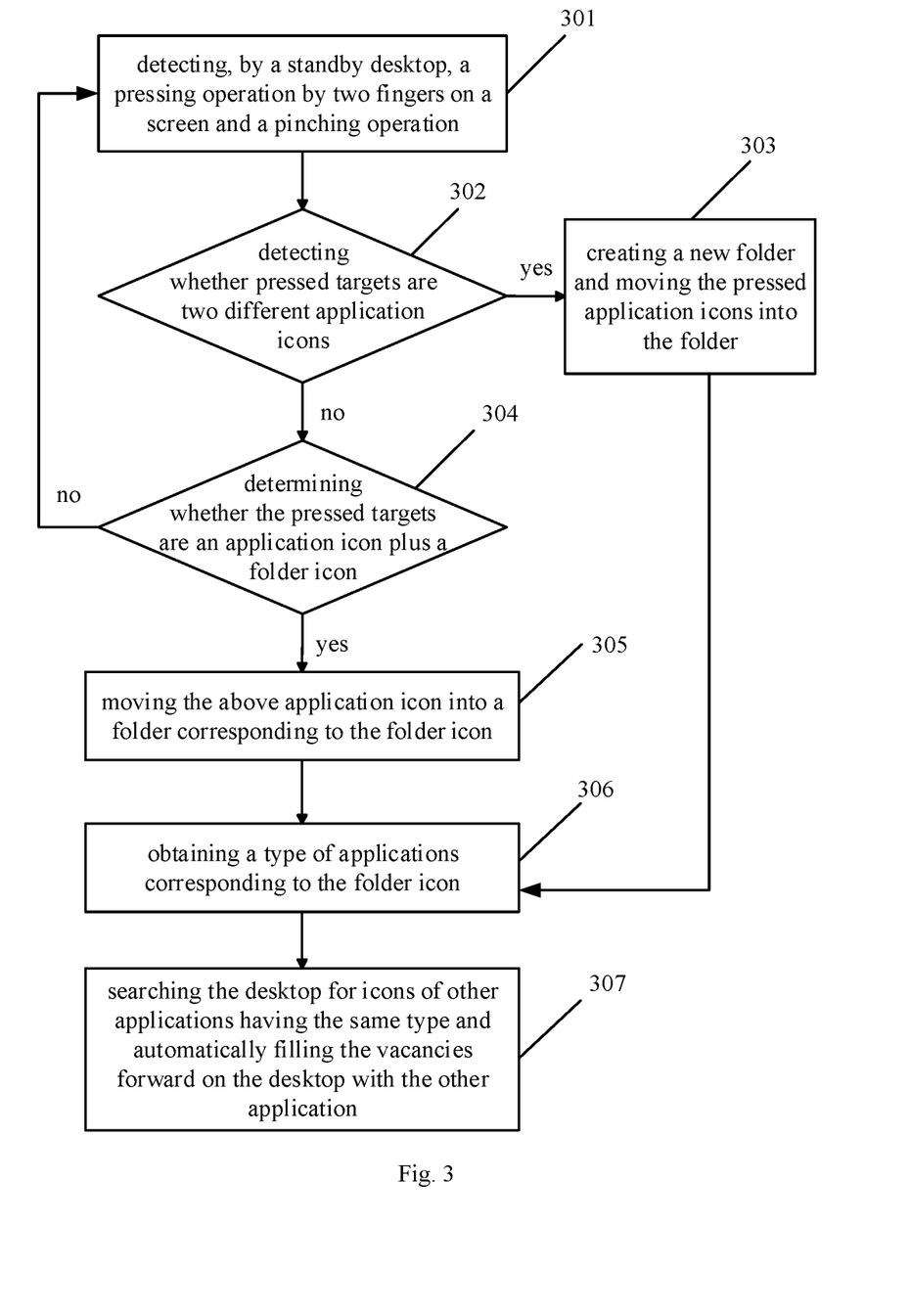
FIG. 3 is a schematic flowchart of a specific application of a method for processing icons according to at least one embodiment of the present disclosure.

In an embodiment, as shown in FIG. 3, the method includes steps 301 to 307.

Step 301 includes detecting, by a standby desktop, a pressing operation by two fingers on a screen and a pinching operation.

Step 302 includes detecting whether pressed targets are two different application icons, if yes, proceeding to step 304, otherwise, proceeding to step 304.

Figure 4:
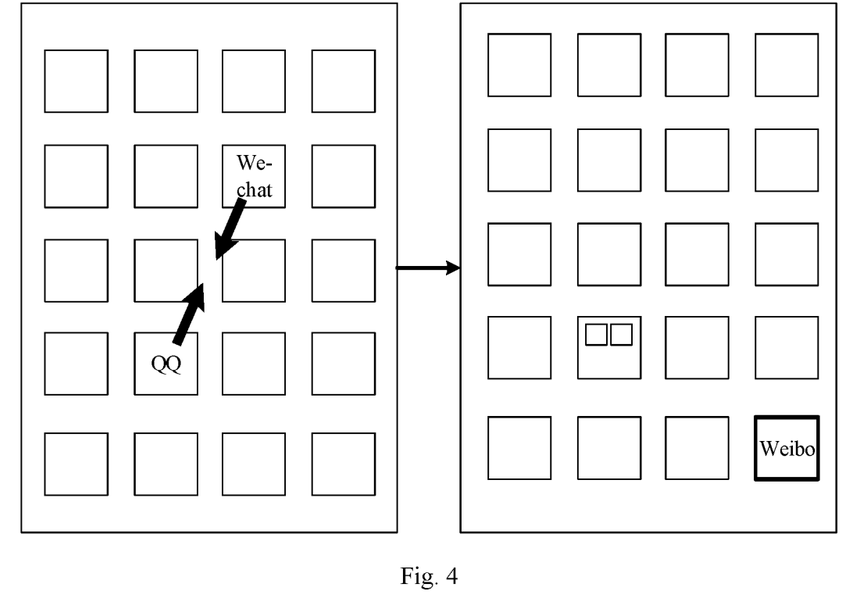
FIG. 4 is a schematic diagram of processing multiple icons according to at least one embodiment of the present disclosure.

Step 303 includes creating a new folder (preferably at a position where the last one of pressed icons is located), moving the pressed application icons into the folder, as shown in FIG. 4, and proceeding to step 306.

Step 304 includes determining whether the pressed targets are an application icon plus a folder icon, if yes, proceeding to step 305, otherwise returning to step 302.

Figure 5:
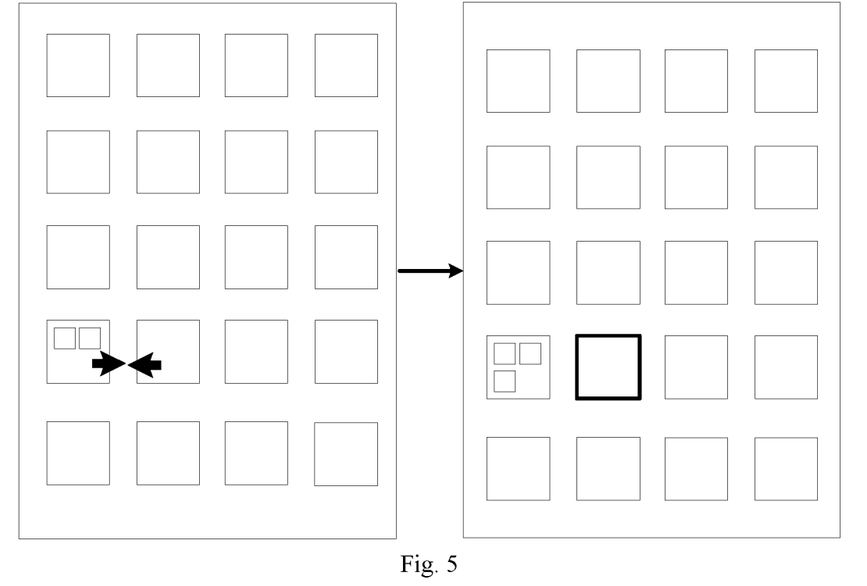
FIG. 5 is a schematic diagram of processing an application icon and a folder icon according to at least one embodiment of the present disclosure.
Figure 6:
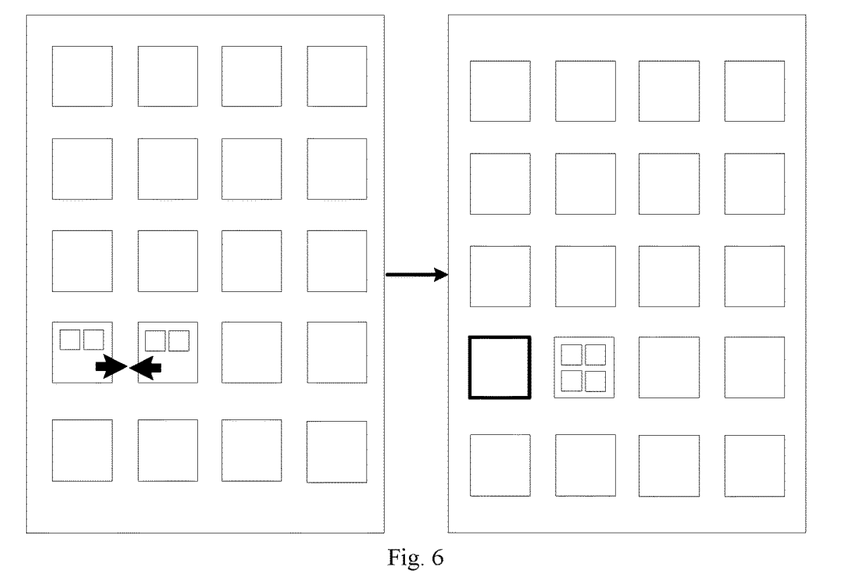
FIG. 6 is a schematic diagram of processing multiple folder icons according to at least one embodiment of the present disclosure.

Step 305 includes moving the above application icon into a folder corresponding to the folder icon, as shown in FIG. 5, and proceeding to step 306.

Step 306 includes obtaining a type of applications corresponding to the folder icon.

Step 307 includes searching the desktop for icons of other applications having the same type and automatically filling the vacancies forward on the desktop with the icons of the other applications.

It is noted herein that in the embodiment, in a case that the determination result in step 304 is negative, which indicates that the pressed targets are two different folder icons, the following operations may be performed: selecting a folder corresponding to one of the pressed targets as a target folder, determining a folder corresponding to the other of the pressed targets as a to-be-processed folder, moving all items in the to-be-processed folder into the target folder and deleting the to-be-processed folder of which all the items have been moved out.

As can be seen from the above, the method for processing icons according to the embodiments can fulfill the demand of quick organizing of desktop icons and provide more interest during the operation while improving experience of use.

Figure 7:
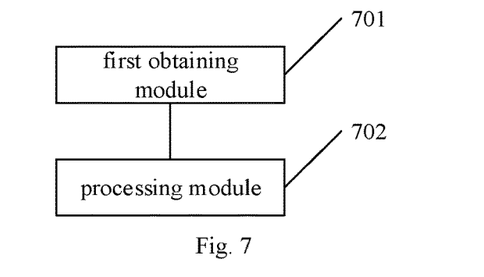
FIG. 7 is a schematic structural diagram of a mobile terminal according to at least one embodiment of the present disclosure.

As shown in FIG. 7, a mobile terminal is provided according to at least one embodiment of the present disclosure, which includes a first obtaining module 701 and a processing module 702.

The first obtaining module 701 is configured to obtain, in response to detecting a pinching operation by a user on multiple icons, attribute information about each icon of the multiple icons.

In the embodiment, which icons are selected may be determined by detecting a pressing operation, and whether there is a pinching operation on the selected icons by the user is then detected. Attribute information about each of the selected icons is obtained in a case that a pinching operation on the icons selected by the user is detected. The pinching operation in the embodiment of the present disclosure refers to an operation event in which the user clicks different icons with multiple fingers and gathers the multiple fingers toward a same center.

The attribute information includes types of icons, which, for example, may be applications or folders.

The processing module 702 is configured to perform a classification operation on the multiple icons based on the attribute information.

In the embodiment, types of the multiple icons can be obtained based on the attribute information, and the icons are classified based on the types.

The classification herein may refer to placing icons of the same type into one category, or placing icons of different type selected by the user into one category, which is not limited herein.

As can be seen from the above, the mobile terminal according to at least one embodiment of the present disclosure obtains attribute information about each icon of the multiple icons in response to detecting a pinching operation by the user on the multiple icons, and performs a classification operation on the multiple icons based on the obtained attribute information. In this way, the icons can be sorted out quickly and conveniently, experience of use and fun of operation are improved, and the problem that the operation of sorting out the desktop icons is complicated in the related art is solved.

In an embodiment, the processing module includes: a determination submodule configured to determine whether the attribute information about the multiple icons is consistent with each other, to obtain a determination result; and a processing submodule configured to perform the classification operation on the multiple icons based on the determination result.

In the embodiment, it may be determined whether some of the attribute information about the multiple icons is consistent with each other or whether all the attribute information about the multiple icons is consistent with each other.

In an embodiment, the processing submodule includes: a first processing unit, configured to: create, in a case that the determination result indicates that the attribute information about the multiple icons is consistent with each other and the attribute information indicates that the multiple icons are all application icons, a folder at a predetermined position on a desktop of the mobile terminal and move all the multiple icons into the (created) folder; or select, in a case that the determination result indicates that the attribute information about the multiple icons is consistent with each other and the attribute information indicates that the multiple icons are all folder icons, a target folder from folders corresponding to the multiple icons, determine the other of the folders as to-be-processed folders, move all items in the to-be-processed folders into the target folder and delete the to-be-processed folders of which all the items have been removed.

Correspondingly, the processing submodule includes a second processing unit configured to: move, in a case that the determination result indicates that the attribute information about the multiple icons is not consistent with each other and the attribute information indicates that the multiple icons include multiple application icons and a folder icon, all the multiple application icons into a folder corresponding to the folder icon; or select, in a case that the determination result indicates that the attribute information about the multiple icons is not consistent with each other and the attribute information indicates that the multiple icons include multiple application icons and multiple folder icons, a target folder from folders corresponding to the multiple folder icons, determine the other folders as to-be-processed folders, move all the multiple application icons and all items in the to-be-processed folders into the target folder and delete the to-be-processed folders of which all the items have been removed.

Further, the mobile terminal further includes: a second obtaining module, configured to obtain an icon on the desktop of the mobile terminal that has met a predetermined condition and has not been sorted out; and perform a predetermined shifting and filling operation on the icon that has met the predetermined condition and has not been sorted out, based on a vacancy occurring after the classification operation.

In other words, some icons meeting the condition are obtained and occupy the vacancies on the desktop (preferably filling the vacancies forward successively) to ensure decent appearance of the desktop.

Specifically, the second obtaining module includes: an obtaining submodule, configured to obtain, from the desktop of the mobile terminal, an icon of the other application having the same type, same installation time and/or same using frequency as applications corresponding to the multiple icons, and determining the icon of the other application as the icon that has met the predetermined condition and has not been sorted out.

To put it another way, the type, installation time and using frequency of the applications corresponding to the sorted-out icons are obtained, and the desktop is searched for icons of other applications having the same type, the same installation time and/or the same using frequency, which are determined as the icons meeting the condition.

In an embodiment, the icon that has met a predetermined condition and has not been sorted out may also be an icon of a folder, which is not limited herein.

All the embodiments of the above-mentioned method for processing icons are applicable to embodiments of the mobile terminal, which can achieve the same technical effects.

Figure 8:
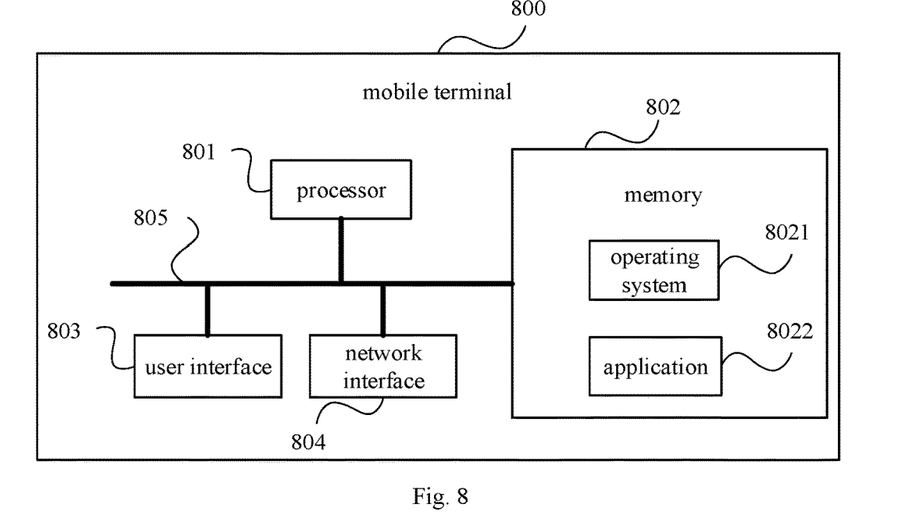
FIG. 8 is a schematic structural diagram of a mobile terminal according to at least one embodiment of the present disclosure.

As shown in FIG. 8, a mobile terminal 800 according to at least one embodiment of the present disclosure includes: at least one processor 801, a memory 802, at least one network interface 804 and a user interface 803. The components of the mobile terminal 800 are coupled together by a bus system 805. Understandably, the bus system 805 is configured to implement connections and communications among the components. In addition to a data bus, the bus system 805 further includes a power supply bus, a control bus and a state signal bus. For clarification considerations, the various buses are denoted by the bus system 805 in FIG. 8.

The user interface 803 may include a display, a keyboard, or a click device (e.g., a mouse, a trackball, a touchpad, or a touch screen).

It is understandable that the memory 802 in the embodiment of the present disclosure may be a volatile memory or a non-volatile memory, or may include both volatile and non-volatile memories. The non-volatile memory may be a read-only memory (Read-Only Memory, ROM), a programmable read-only memory (Programmable ROM, PROM), an erasable programmable read-only memory (Erasable PROM, EPROM), or an electrically erasable programmable read-only memory (Electrically EPROM, EEPROM) or a flash memory. The volatile memory may be a random access memory (Random Access Memory, RAM) that acts as a high-speed external cache. By way of example and not limitation, many kinds of RAM are viable, such as static random access memory (Static RAM, SRAM), dynamic random access memory (Dynamic RAM, DRAM), synchronous dynamic random access memory (Synchronous DRAM, SDRAM), double data rate synchronous dynamic random access memory (Double Data Rate SDRAM, DDRSDRAM), enhanced synchronous dynamic random access memory (Enhanced SDRAM, ESDRAM), synchlink connection dynamic random access memory (Synchlink DRAM, SDRAM) and direct memory bus random access memory (Direct Rambus RAM, DRRAM). The memory 802 of the systems and methods described herein is intended to include, but not limited to, these and any other suitable types of memory.

In some implementations, the memory 802 stores following elements, such as executable modules, data structures, or a subset thereof, or an extended set thereof, for example, an operating system 8021 and an application 8022.

The operating system 8021 includes various system programs, such as a framework layer, a core library layer, a driver layer, and the like, for implementing various basic services and processing hardware-based tasks. The application 8022 includes various applications programs, such as a media player (Media Player), a browser (Browser), and the like, for implementing various application services. A program implementing the method of the embodiments of the present disclosure may be included in the application 8022.

In an embodiment of the present disclosure, by invoking a program or instructions stored in the memory 802, specifically, the program or instructions stored in the application 8022, the processor 801 is configured to: obtain, in response to detecting a pinching operation by a user on multiple icons, attribute information about each icon of the multiple icons; and perform a classification operation on the multiple icons based on the attribute information.

All the methods according to the foregoing embodiments of the present disclosure can be applied to the processor 801, or implemented by the processor 801. The processor 801 may be an integrated circuit chip with signal processing capabilities. In implementation, each step of the foregoing methods may be completed by an integrated logic circuit in form of hardware in the processor 801 or instructions in form of software. The above processor 801 may be a general-purpose processor, a digital signal processor (Digital Signal Processor, DSP), an application specific integrated circuit (Application Specific Integrated Circuit, ASIC), a field programmable gate array (Field Programmable Gate Array, FPGA) or any other programmable logic device, discrete gate, transistor logic device or discrete hardware component, which can implement or carry out the methods, steps, and logical block diagrams according to the embodiments of the present disclosure. The general-purpose processor may be a microprocessor, or the processor may be any conventional processor or the like. The steps of the methods according to the embodiments of the present disclosure may be directly implemented by a hardware decoding processor, or may be performed by a combination of hardware and software modules in the decoding processor. The software module can be located in a conventional storage medium such as a random access memory, a flash memory, a read-only memory, a programmable read-only memory, an electrically erasable programmable memory, a registers, or the like. The storage medium is located in the memory 802, and the processor 801 reads the information in the memory 802 and completes the steps of the above methods in combination with its hardware.

It is understandable that the embodiments described herein can be implemented in hardware, software, firmware, middleware, microcode, or a combination thereof. For hardware implementation, the processing unit can be implemented in one or more of an application specific integrated circuit (Application Specific Integrated Circuits, ASIC), a digital signal processor (Digital Signal Processing, DSP), a digital signal processing device (DSP Device, DSPD), a programmable logic device (Programmable Logic Device, PLD), a field-programmable gate array (Field-Programmable Gate Array, FPGA), a general-purpose processor, a controller, a microcontroller, a microprocessor, other electronic units for performing the functions according to the present disclosure, or a combination of the above.

For software implementation, the technical solutions according to the present disclosure may be implemented by modules (e.g., processes, functions, and so on) for performing the functions according to the present disclosure. The software code may be stored in the memory and executed by the processor, and the memory may be implemented inside or outside the processor.

Optionally, the processor 801 is configured to: determine whether the attribute information about the multiple icons is consistent with each other, to obtain a determination result; and perform the classification operation on the multiple icons based on the determination result.

Optionally, the processor 801 is configured to: create, in a case that the determination result indicates that the attribute information about the multiple icons is consistent with each other and the attribute information indicates that the multiple icons are all application icons, a folder at a predetermined position on a desktop of the mobile terminal and move all the multiple icons into the folder; or select, in a case that the determination result indicates that the attribute information about the multiple icons is consistent with each other and the attribute information indicates that the multiple icons are all folder icons, a target folder from folders corresponding to the multiple icons, determine the other of the folders as to-be-processed folders, move all items in the to-be-processed folders into the target folder and delete the to-be-processed folders of which all the items have been removed.

Optionally, the processor 801 is configured to: move, in a case that the determination result indicates that the attribute information about the multiple icons is not consistent with each other and the attribute information indicates that the multiple icons include multiple application icons and a folder icon, all the multiple application icons into a folder corresponding to the folder icon; or select, in a case that the determination result indicates that the attribute information about the multiple icons is not consistent with each other and the attribute information indicates that the multiple icons include multiple application icons and multiple folder icons, a target folder from folders corresponding to the multiple folder icons, determine the other of the folders as to-be-processed folders, move all the multiple application icons and all items in the to-be-processed folders into the target folder and delete the to-be-processed folders of which all the items have been removed.

Optionally, the processor 801 is further configured to: obtain an icon on the desktop of the mobile terminal that has met a predetermined condition and has not been sorted out, after performing the classification operation on the multiple icons based on the attribute information; and perform a predetermined shifting and filling operation on the icon that has met the predetermined condition and has not been sorted out, based on a vacancy occurring after the classification operation.

Optionally, the processor 801 is configured to: obtain, from the desktop of the mobile terminal, an icon of the other application having the same type, same installation time and/or same using frequency as applications corresponding to the multiple icons, and determine the icon of the other application as the icon that has met a predetermined condition and has not been sorted out.

The mobile terminal 800 can implement the processes performed by the mobile terminal according to the foregoing embodiments, which is not described herein to avoid repetition.

As can be seem from the above, the mobile terminal according to at least one embodiment of the present disclosure obtains attribute information about each icon the multiple icons in response to detecting a pinching operation by the user on the multiple icons, and performs a classification operation on the multiple icons based on the obtained attribute information. In this way, the icons can be sorted out quickly and conveniently, experience of use and fun of operation are improved, and the problem that the operation of sorting out the desktop icons is complicated in the related art is solved.

Figure 9:
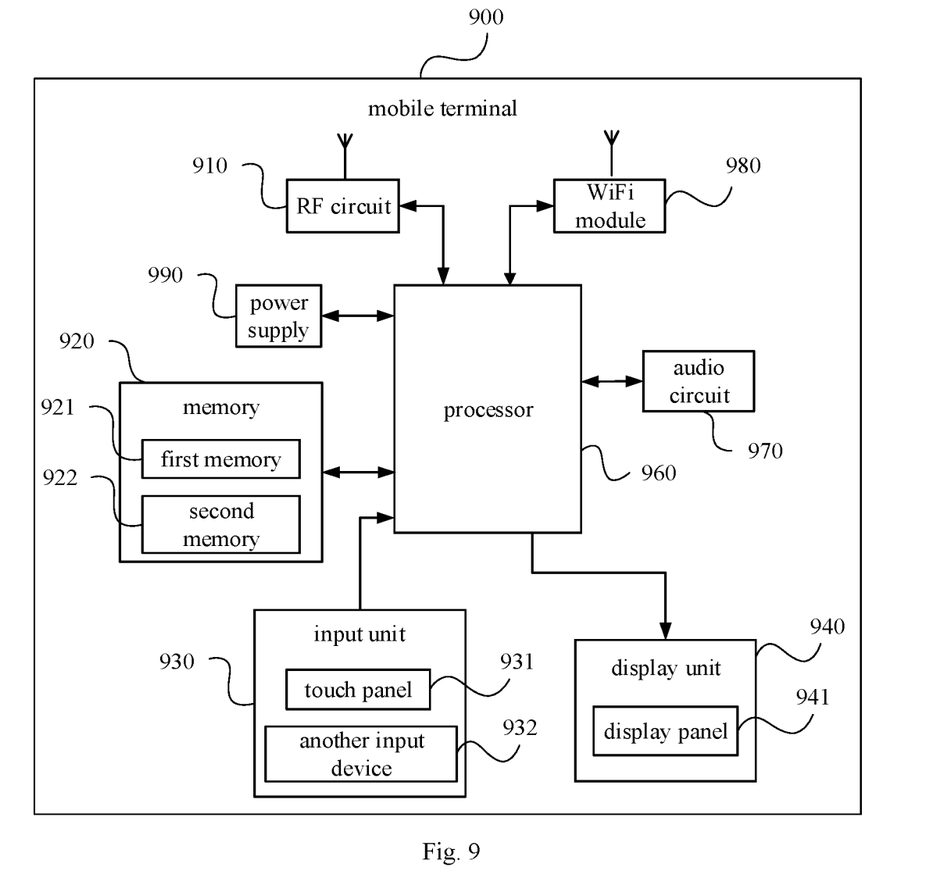
FIG. 9 is a schematic structural diagram of a mobile terminal according to at least one embodiment of the present disclosure.

As shown in FIG. 9, a mobile terminal 900 according to at least one embodiment of the present disclosure may be a cellphone, a tablet computer, a personal digital assistant (Personal Digital Assistant, PDA) or an on-board computer.

The mobile terminal 900 shown in FIG. 9 includes a radio frequency (Radio Frequency, RF) circuit 910, a memory 920, an input unit 930, a display unit 940, a processor 960, an audio circuit 970, a Wi-Fi (Wireless Fidelity) module 980 and a power supply 990.

The input unit 930 may be configured to receive numeric or character information inputted by a user, and to generate signal inputs related to user settings and function control of the mobile terminal 900. Specifically, in an embodiment of the present disclosure, the input unit 930 may include a touch panel 931. The touch panel 931, also referred to as a touch screen, may collect touch operations by the user on or near the touch panel (such as an operation performed by the user using any suitable object or accessory such as a finger or a stylus on the touch panel 931), and drive a corresponding connection apparatus according to a preset program. Optionally, the touch panel 931 may include two parts: a touch detection apparatus and a touch controller. The touch detection apparatus is configured to detect a touch position of the user, detect a signal generated due to the touch operation, and transmit the signal to the touch controller; and the touch controller is configured to receive the touch information from the touch detection device, convert the touch information into contact coordinates, send the contact coordinates to the processor 960, and receive and execute commands from the processor 960. In addition, the touch panel 931 may be implemented in various types such as resistive, capacitive, infrared, and surface acoustic waves. In addition to the touch panel 931, the input unit 930 may further include another input device 932. The input device 932 may include, but not limited to, one or more of a physical keyboard, a function button (such as a volume control button and a switch buttons), a trackball, a mouse, or a joystick.

The display unit 940 may be used to display information inputted by the user or information provided to the user and various menu interfaces of the mobile terminal 900. The display unit 940 may include a display panel 941. Optionally, the display panel 941 may be configured in the form of a liquid crystal display (LCD) panel or an organic light-emitting diode (Organic Light-Emitting Diode, OLED).

It should be noted that the touch panel 931 may cover the display panel 941 to form a touch display screen, and when the touch display screen detects a touch operation on or near it, the touch operation is transmitted to the processor 960 to determine the type of the touch event, and then the processor 960 provides a corresponding visual output on the touch display screen based on the type of touch event.

The touch display screen includes an application interface display region and a commonly-used control display area. An arrangement mode of the application interface display region and the common control display region is not limited, which may be up-and-down arrangement or left-and-right arrangement, as long as the two display regions can be distinguished from each other. The application interface display region may be used to display interfaces of applications. Each interface may include interface elements such as at least one application icon and/or widget desktop control. The application interface display region may also be an empty interface that does not contain any content. The commonly-used control display region is used to display controls which are used frequently, for example, a setting button, an interface number, a scroll bar, and application icons such as a phone book icon.

The processor 960 is the control center of the mobile terminal 900, which connects various parts of the entire mobile phone by using various interfaces and wirings, performs functions of the mobile terminal 900 and process data by running or executing software programs and/or modules stored in a first memory 921 and invoking data stored in a second memory 922, thereby performing overall monitoring on the mobile terminal 900. Optionally, the processor 960 may include one or more processing units.

In an embodiment of the present disclosure, the processor 960 is configured, by invoking the software programs and/or modules stored in the first memory 921 and the data stored in the second memory 922, to: obtain, in response to detecting a pinching operation by a user on multiple icons, attribute information about each icon of the multiple icons; and perform a classification operation on the multiple icons based on the attribute information.

Optionally, the processor 960 is configured to: determine whether the attribute information about the multiple icons is consistent with each other, to obtain a determination result; and perform the classification operation on the multiple icons based on the determination result.

Optionally, the processor 960 is configured to: create, in a case that the determination result indicates that the attribute information about the multiple icons is consistent with each other and the attribute information indicates that the multiple icons are all application icons, a folder in a predetermined position on a desktop of the mobile terminal and move all the multiple icons into the folder; or select, in a case that the determination result indicates that the attribute information is consistent with each other and the attribute information indicates that the multiple icons are all folder icons, a target folder from folders corresponding to the multiple icons, determine the other of the folders as to-be-processed folders, move all items in the to-be-processed folders into the target folder and delete the to-be-processed folders of which all the items have been removed.

Optionally, the processor 960 is configured to: move, in a case that the determination result indicates that the attribute information about the multiple icons is not consistent with each other and the attribute information indicates that the multiple icons include multiple application icons and a folder icon, all the multiple application icons into a folder corresponding to the folder icon; or select, in a case that the determination result indicates that the attribute information is not consistent with each other and the attribute information indicates that the multiple icons include multiple application icons and multiple folder icons, a target folder from folders corresponding to the multiple folder icons, determine the other of the folders as to-be-processed folders, move all the multiple application icons and all items in the to-be-processed folders into the target folder and delete the to-be-processed folders of which all the items have been removed.

Optionally, the processor 960 is further configured to: obtain an icon on the desktop of the mobile terminal that has met a predetermined condition and has not been sorted out, after performing the classification operation on the multiple icons based on the attribute information; and perform a predetermined shifting and filling operation on the icon that has met the predetermined condition and has not been sorted out, based on a vacancy occurring after the classification operation.

Optionally, the processor 960 is configured to: obtain, from the desktop of the mobile terminal, an icon of the other application having the same type, same installation time and/or same using frequency as applications corresponding to the multiple icons, and determine the icon of the other application as the icon that has met a predetermined condition and has not been sorted out.

As can be seen, the mobile terminal according to at least one embodiment of the present disclosure obtains attribute information about each of the multiple icons in response to detecting a pinching operation by the user on the multiple icons, and performs a classification operation on the multiple icons based on the obtained attribute information. In this way, the icons can be sorted out quickly and conveniently, experience of use and fun of operation are improved, and the problem that the operation of sorting out the desktop icons is complicated in the related art is solved.

It should be noted that the embodiments in the specification are described in a progressive manner, each embodiment emphasizes differences from other embodiments and reference can be made to each other for similar parts among the embodiments.

Those skilled in the art will well appreciate that the units and algorithm steps of the various examples described in conjunction with the embodiments according to the present disclosure can be implemented in the form of electronic hardware or a combination of computer software and electronic hardware. Whether these functions are performed in hardware or software depends on the specific application and design constraints of the solution. Those skilled in the art can use different methods to implement the described functions for each particular application, but such implementation should not be considered as going beyond the scope of the present disclosure.

Those skilled in the art can clearly understand that for convenience and brevity of description, reference can be made to the corresponding processes in the foregoing method embodiment for specific operating processes of the system, the device and the units described above, which is therefore not described herein redundantly.

It should be understood that in the embodiments according to the present application, the disclosed apparatus and method may be implemented in other manners. For example, the apparatus embodiments described above are merely illustrative. For example, the division of the units is only a logical function division, and in practical implementation, there may be another manner of division. For example, multiple units or components may be combined or integrated into another system, or some features can be ignored or not implemented. In addition, the mutual coupling or direct coupling or communication connection shown or discussed may be implemented with some interfaces, and indirect coupling or communication connection between apparatuses or units may be electrical, mechanical or in other forms.

The units described as separate components may or may not be physically separated, and the components shown as units may or may not be physical units, that is, they may be located in one place or distributed to multiple network units. Some or all of the units may be selected according to practical needs to achieve the objective of the technical solutions of the embodiments.

In addition, functional units in various embodiments of the present disclosure may be integrated into one processing unit, or each unit may exist physically separately, or two or more units may be integrated into one unit.

In a case that the functions are implemented in the form of a software functional unit which is sold or used as a standalone product, the product may be stored in a computer readable storage medium. Based on such understanding, the essence or the portion of the technical solutions of the present disclosure that contributes to the prior art may be embodied in the form of a software product. The computer software product is stored in a storage medium, which includes instructions that cause a computer device (which may be a personal computer, a server or a network device) to perform all or part of the steps of the methods according to the embodiments of the present disclosure. The foregoing storage medium may include any storage medium that can store program codes, such as a USB flash drive, a mobile hard disk, a ROM, a RAM, a magnetic disk, or an optical disk.

It should also be noted that, in this specification, relational terms such as first and second are used merely to distinguish one entity or operation from another entity or operation, without necessarily requiring or implying any such actual relationship or order between such entities or operations. Furthermore, the terms "comprise" or "include" or any other variations are intended to encompass a non-exclusive inclusion, such that a process, method, article, or terminal device that includes multiple elements includes not only those elements but also elements that are not listed, or includes elements inherent to such process, method, article, or terminal device. Without further limitations, an element preceded by the phrase "including a . . . " does not exclude the presence of additional identical elements in the process, method, article, or terminal device that includes the element.

The above-described embodiments are merely some specific embodiments of the present disclosure, but the scope of the present disclosure is not limited to the embodiments. A person skilled in the art can make further modifications or substitutions within technical principles of the present disclosure, and these modifications or substitutions shall fall within the scope of the present disclosure. Therefore, the scope of the present disclosure shall be defined by the appended claims.

What is claimed is:

1. A method for processing icons, applied to a mobile terminal, comprising:

obtaining, in response to detecting a pinching operation by a user on a plurality of icons, attribute information about each icon of the plurality of icons; and performing a classification operation on the plurality of icons based on the attribute information, wherein the classification operation comprises sorting out the plurality of icons into a newly created folder or a folder corresponding to a folder icon of the plurality of icons, wherein after performing the classification operation on the plurality of icons based on the attribute information, the method further comprises:

obtaining an icon on the desktop of the mobile terminal that has met a predetermined condition and has not been sorted out; and performing a predetermined shifting and filling operation on the icon that has met the predetermined condition and has not been sorted out, based on a vacancy occurring after the classification operation, wherein the obtaining the icon on the desktop of the mobile terminal that has met a predetermined condition and has not been sorted out comprises:

obtaining, from the desktop of the mobile terminal, an icon of a first application other than applications corresponding to the plurality of icons; and determining the icon of the first application as the icon that has met the predetermined condition and has not been sorted out, wherein the meeting the predetermined condition is that at least one of a type, an installation time, or a using frequency of the first application is the same as that of an application in the applications corresponding to the plurality of icons, wherein the performing the classification operation on the plurality of icons based on the attribute information comprises:

determining whether the attribute information about the plurality of icons is consistent with each other, to obtain a determination result; and performing the classification operation on the plurality of icons based on the determination result, wherein the performing the classification operation on the plurality of icons based on the determination result comprises:

selecting, in a case that the determination result indicates that the attribute information about the plurality of icons is not consistent with each other and the attribute information indicates that the plurality of icons comprises a plurality of application icons and a plurality of folder icons, a target folder from folders corresponding to the plurality of folder icons, determining the other of the folders as to-be-processed folders, moving all the plurality of application icons and all items in the to-be-processed folders into the target folder and deleting the to-be-processed folders of which all the items have been moved out.

2. The method according to claim 1, wherein the performing the classification operation on the plurality of icons based on the determination result comprises:

creating, in a case that the determination result indicates
that the attribute information about the plurality of
icons is consistent with each other and the attribute
information indicates that the plurality of icons each is
an application icon, a folder at a predetermined position
on a desktop of the mobile terminal, and moving all the
plurality of icons into the folder; or selecting, in a case that the determination result indicates
that the attribute information about the plurality of
icons is consistent with each other and the attribute
information indicates that the plurality of icons each is
a folder icon, a target folder from folders corresponding
to the plurality of icons, determining the other of the
folders as to-be-processed folders, moving all items in
the to-be-processed folders into the target folder and
deleting the to-be-processed folders of which all the
items have been moved out.

3. The method according to claim 1, wherein the performing the classification operation on the plurality of icons based on the determination result comprises:

moving, in a case that the determination result indicates
that the attribute information about the plurality of
icons is not consistent with each other and the attribute
information indicates that the plurality of icons comprises a plurality of application icons and a folder icon,
all the plurality of application icons into a folder
corresponding to the folder icon.

4. A mobile terminal, comprising:

a memory, a processor and a computer program that is
stored in the memory and executable on the processor,
wherein when executing the computer program, the
processor is configured to:

obtain, in response to detecting a pinching operation by a
user on a plurality of icons, attribute information about
each icon of the plurality of icons; and perform a classification operation on the plurality of icons
based on the attribute information, wherein the classification operation comprises sorting out the plurality of
icons into a newly created folder or a folder corresponding to a folder icon of the plurality of icons, wherein after performing the classification operation on
the plurality of icons based on the attribute information,
the processor is further configured to:

obtain an icon on the desktop of the mobile terminal that
has met a predetermined condition and has not been
sorted out; and perform a predetermined shifting and filling operation on
the icon that has met the predetermined condition and
has not been sorted out, based on a vacancy occurring
after the classification operation, wherein when obtaining the icon on the desktop of the
mobile terminal that has met a predetermined condition
and has not been sorted out, the processor is configured
to:

obtain, from the desktop of the mobile terminal, an icon
of a first application other than applications corresponding to the plurality of icons; and determine the
icon of the first application as the icon that has met a
predetermined condition and has not been sorted out,
wherein the meeting the predetermined condition is that
at least one of a type, an installation time, or a using
frequency of the first application is the same as that of
an application in the applications corresponding to the
plurality of icons;

wherein the performing the classification operation on the
plurality of icons based on the attribute information
comprises:

determining whether the attribute information about the
plurality of icons is consistent with each other, to obtain
a determination result; and performing the classification operation on the plurality of
icons based on the determination result, wherein the performing the classification operation on the
plurality of icons based on the determination result
comprises:

selecting, in a case that the determination result indicates
that the attribute information about the plurality of
icons is not consistent with each other and the attribute
information indicates that the plurality of icons comprises a plurality of application icons and a plurality of
folder icons, a target folder from folders corresponding
to the plurality of folder icons, determining the other of
the folders as to-be-processed folders, moving all the
plurality of application icons and all items in the
to-be-processed folders into the target folder and deleting the to-be-processed folders of which all the items
have been moved out.

5. The mobile terminal according to claim 4, wherein when performing the classification operation on the plurality of icons based on the determination result, the processor is configured to:

create, in a case that the determination result indicates that
the attribute information is consistent with each other
and the attribute information indicates that the plurality
of icons each is an application icon, a folder at a
predetermined position on a desktop of the mobile
terminal, and move all the plurality of icons into the
folder; or select, in a case that the determination result indicates that
the attribute information about the plurality of icons is
consistent with each other and the attribute information
indicates that the plurality of icons each is a folder icon,
a target folder from folders corresponding to the plurality of icons, determine the other of the folders as
to-be-processed folders, move all items in the to-be-processed folders into the target folder and delete the
to-be-processed folders of which all the items have
been moved out.

6. The mobile terminal according to claim 4, wherein when performing the classification operation on the plurality of icons based on the determination result, the processor is configured to:

move, in a case that the determination result indicates that
the attribute information about the plurality of icons is
not consistent with each other and the attribute information indicates that the plurality of icons comprises a
plurality of application icons and a folder icon, all the
plurality of application icons into a folder corresponding to the folder icon.

7. A non-transitory computer readable storage medium, wherein a computer program is stored thereon, and the computer program is executed by a processor to implement the steps of the method according to claim 1.

8. The non-transitory computer readable storage medium according to claim 7, wherein the computer program is executed by the processor to further implement steps:

creating, in a case that the determination result indicates
that the attribute information about the plurality of
icons is consistent with each other and the attribute
information indicates that the plurality of icons each is
an application icon, a folder at a predetermined position
on a desktop of the mobile terminal, and moving all the
plurality of icons into the folder; or selecting, in a case that the determination result indicates that the attribute information about the plurality of icons is consistent with each other and the attribute information indicates that the plurality of icons each is a folder icon, a target folder from folders corresponding to the plurality of icons, determining the other of the folders as to-be-processed folders, moving all items in the to-be-processed folders into the target folder and deleting the to-be-processed folders of which all the items have been moved out.

9. The non-transitory computer readable storage medium according to claim 7, wherein the computer program is executed by the processor to further implement steps:

moving, in a case that the determination result indicates that the attribute information about the plurality of icons is not consistent with each other and the attribute information indicates that the plurality of icons comprises a plurality of application icons and a folder icon, all the plurality of application icons into a folder corresponding to the folder icon.

* * * * *